United States Patent
Asano

(10) Patent No.: US 7,203,861 B1
(45) Date of Patent: Apr. 10, 2007

(54) METHOD AND SYSTEM FOR REMOTELY BACKING UP A COMPUTER MEMORY UTILIZING A GLOBAL COMMUNICATIONS NETWORK

(75) Inventor: Shintaro Asano, New Castle, NH (US)

(73) Assignee: Cablynx, Inc., Woburn, MA (US)

( * ) Notice: Subject to any disclaimer, the term of this patent is extended or adjusted under 35 U.S.C. 154(b) by 887 days.

(21) Appl. No.: 09/802,093

(22) Filed: Mar. 8, 2001

Related U.S. Application Data

(60) Provisional application No. 60/187,843, filed on Mar. 8, 2000.

(51) Int. Cl.
*G06F 11/00* (2006.01)

(52) U.S. Cl. .................... 714/6; 714/4; 714/5; 711/112

(58) Field of Classification Search ............ 714/4, 714/5, 6; 709/227; 711/112
See application file for complete search history.

(56) References Cited

U.S. PATENT DOCUMENTS

| | | | |
|---|---|---|---|
| 5,133,065 A | 7/1992 | Cheffetz et al. | |
| 5,559,991 A | 9/1996 | Kanfi | |
| 5,764,903 A * | 6/1998 | Yu | ............. 709/208 |
| 5,765,173 A | 6/1998 | Cane et al. | |
| 5,778,395 A | 7/1998 | Whiting et al. | |
| 5,799,147 A * | 8/1998 | Shannon | ......... 714/6 |
| 5,978,791 A | 11/1999 | Farber et al. | |
| 6,101,507 A | 8/2000 | Cane et al. | |
| 6,260,124 B1 * | 7/2001 | Crockett et al. | ............ 711/162 |
| 6,289,463 B1 * | 9/2001 | Fink | ........... 713/202 |
| 6,347,339 B1 * | 2/2002 | Morris et al. | ............. 709/237 |
| 6,360,330 B1 * | 3/2002 | Mutalik et al. | ......... 714/4 |
| 6,460,055 B1 * | 10/2002 | Midgley et al. | ............ 707/204 |
| 6,496,949 B1 * | 12/2002 | Kanevsky et al. | ............ 714/47 |
| 6,912,629 B1 * | 6/2005 | West et al. | ................. 711/161 |
| 2002/0049925 A1 * | 4/2002 | Galipeau et al. | ............. 714/6 |
| 2002/0099916 A1 * | 7/2002 | Ohran et al. | ................ 711/162 |

* cited by examiner

*Primary Examiner*—Robert Beausoliel
*Assistant Examiner*—Yolanda L Wilson
(74) *Attorney, Agent, or Firm*—Lowrie, Lando & Anastasi, LLP

(57) ABSTRACT

Embodiments of the present invention relate to a method and system for remotely backing-up computer memories utilizing a global communications network. An embodiment of the present invention utilizes the INTERNET to access a plurality of computers. The plurality of computers is in electrical communication with a central office. In one embodiment of the invention, a computer located in the central office administers a memory back-up procedure at a customer's location. The central office computer may also assess whether the memory back-up procedure has been successfully completed, and if not, send an electronic notification to a predetermined system or individual that a failure has occurred, and to automatically provide repairs.

7 Claims, 2 Drawing Sheets

METHOD AND SYSTEM FOR REMOTELY BACKING UP A COMPUTER MEMORY UTILIZING A GLOBAL COMMUNICATIONS NETWORK

CLAIM OF PRIORITY TO PRIOR APPLICATION

This application claims priority under 35 U.S.C. § 119(e) to U.S. provisional patent application Ser. No. 60/187,843, filed on Mar. 8, 2000, incorporated herein by reference.

FIELD OF THE INVENTION

Embodiments of the present invention are directed to a method and system for remotely backing-up a computer memory utilizing a global communications network. More specifically, embodiments of the present invention are directed to a method and system that remotely administers a memory back-up procedure, ensures that the memory back-up procedure is successfully completed, and automatically performs necessary repairs.

BACKGROUND OF THE INVENTION

Backing-up computer memory essentially consists of making a copy of the computer's hard drive and storing that copy in a remote location. It is well known that errors in back-up procedures occur frequently, however, these errors may not be detected and repaired until days, weeks, or months after the back-up procedure has been performed. The errors may result from mechanical failures, computer viruses, natural disasters or human error.

With the advent of the INTERNET, systems have been developed to provide computer back-up services by remotely connecting to a customer site to perform a computer memory back-up procedure. However, many individuals dislike the idea of providing a memory backup procedure through an open media like the INTERNET. Transferring private files over the INTERNET may compromise privacy, and may seriously damage any data in the files. Furthermore, processes for efficiently transferring large data files utilizing the INTERNET typically require very expensive wideband T1 connections.

Typically, speed of data recovery is not a concern. However, a memory back-up procedure that requires 10–20 minutes is preferred over an off site memory storage facility that may require as much as two days to recover any stored data.

SUMMARY OF THE INVENTION

Embodiments of the present invention relate to a method and system for remotely administering a data storage backup process of a computer utilizing a network. In one embodiment, the system of the invention for administering a data storage backup process of a computer comprises means for remotely coupling to the computer, means for sending a signal to identify a problem in the data storage backup process, means for remotely repairing the problem and means for sending a signal to indicate that the data storage backup process is complete.

In one embodiment, a system is provided for administering a transfer of electronic data to a data storage device comprising a first computer and a second computer operatively coupled to the first computer through a network. In one embodiment, the network includes the Internet. The first computer is programmed to receive an electronic message from the second computer and, in response to the message, to remotely administer the transfer of electronic data from the second computer to the data storage device. In one embodiment, the data storage device includes an automatic transfer library that is operatively coupled to the first computer and/or the second computer. The first computer is further programmed to transmit an electronic message to indicate that the transfer of electronic data is complete.

The first computer of the system of the invention is also programmed to transmit an electronic message to identify a problem in the transfer of electronic data to the data storage device and to identify a repair that is required to correct the problem. The first computer either remotely repairs the problem or transmits an electronic message to notify an administrator local to the second computer to perform the repair.

In another embodiment, a method of administering a transfer of electronic data to a data storage device is provided comprising coupling a first computer to a second computer through a network, administering the transfer of electronic data to the data storage device and transmitting an electronic message from the first computer to indicate the transfer of electronic data is complete. In one embodiment, the network includes the Internet. The data storage device is operatively coupled to the first and/or the second computer. In one embodiment, the data storage device includes an automatic transfer library.

The method of the invention further comprises transmitting an electronic signal from the first computer to operatively couple the first and second computers, wherein the electronic signal is recognized by the second computer. If the electronic signal is not recognized, the transfer of electronic data is terminated and the first and second computers are decoupled. The method includes recording the termination of the transfer of electronic data and the decoupling of the first and second computers.

In addition, the method comprises identifying a problem in the transfer of electronic data and remotely repairing the problem. In one embodiment, the method comprises notifying an administrator local to the second computer to repair the problem in the transfer of electronic data.

BRIEF DESCRIPTION OF THE DRAWINGS

For a better understanding of the invention, reference is made to the drawings, which are incorporated herein by reference and in which like reference characters generally refer to the same parts throughout the drawings. The drawings are not rendered to scale with emphasis upon illustrating the principles of the invention and in which.

DETAILED DESCRIPTION OF THE INVENTION

Embodiments of the present invention are generally directed to a method and apparatus for automatically backing-up a computer system and ensuring that the back-up was successfully completed. In particular, embodiments of the present invention are directed to a method of remotely backing-up a computer system and utilizing a global communications network to ensure that the back-up was successfully completed. Embodiments of the present invention will now be described with reference to FIGS. 1–2.

Figure 1:
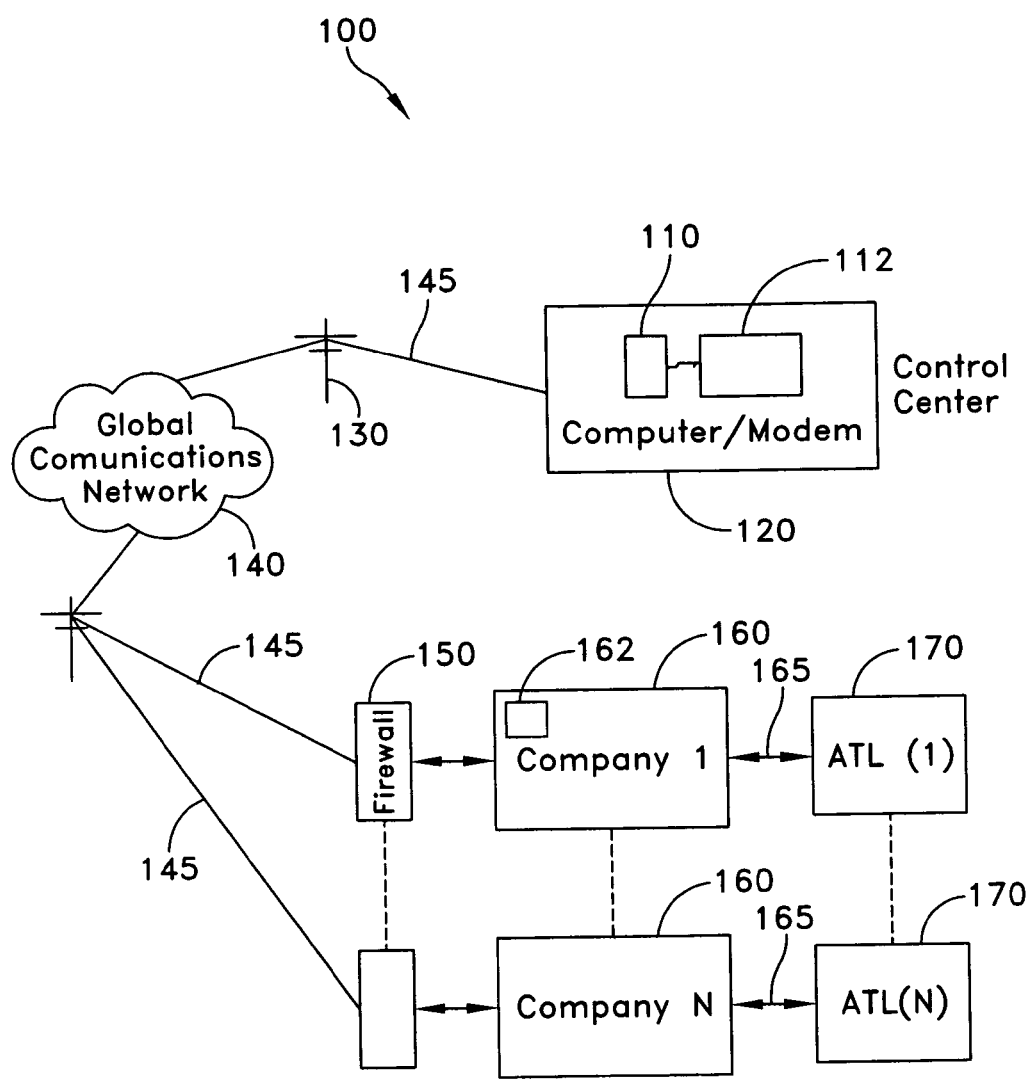
FIG. 1 is a schematic diagram of a communications network that implements an embodiment of the invention.

FIG. 1 is a schematic diagram of a communications network 100 that implements a method of the invention. The communications network 100 includes a central office 120 that further includes a first computer 112. The central office 120 is in electronic communication with a plurality of computers 160. The plurality of computers belongs to various customers that request the back-up procedure of the invention. The central office 120 is in communication with the plurality of computers through a global communications network 140, such as the INTERNET. In general, the first computer 112 located in the central office 120 connects to the global communications network 140 through a modem 110. The modem 110 is in electrical communication with a telephone line 145 that connects to the global communications network 140.

Typically, the global communications network 140 includes an internet service provider (ISP). In one embodiment of the invention, the ISP facilitates an electronic connection to the plurality of computers 160 through the telephone line 145. In one embodiment, the computers 160 are individually connected to separate automatic transfer libraries 170. In one aspect of the invention, a dedicated electronic link 165 is provided. The dedicated electronic link 165 connects the automatic transfer libraries to one of the plurality of computers 160.

In one embodiment, a communications network may comprise one or more telephone lines or other networking system to operatively couple a first computer 112 with a computer network 120 or a second computer 162.

Utilizing the communications network 100 shown in FIG. 1, the first computer 112 receives a ready signal from a customer's computer network 160, and the first computer 112 electronically connects to the customer's computer network 160 after passing through a firewall 150. The first computer 112 administers a transfer of data to the ATL 170 as described hereinbelow. Upon termination of the data transfer, the first computer 112 sends an appropriate electronic message that the data transfer was successfully completed or repairs are required. If repairs are required, then the first computer 112 may remotely perform any required repairs, or notify the local administrator that human intervention is required.

Figure 2:
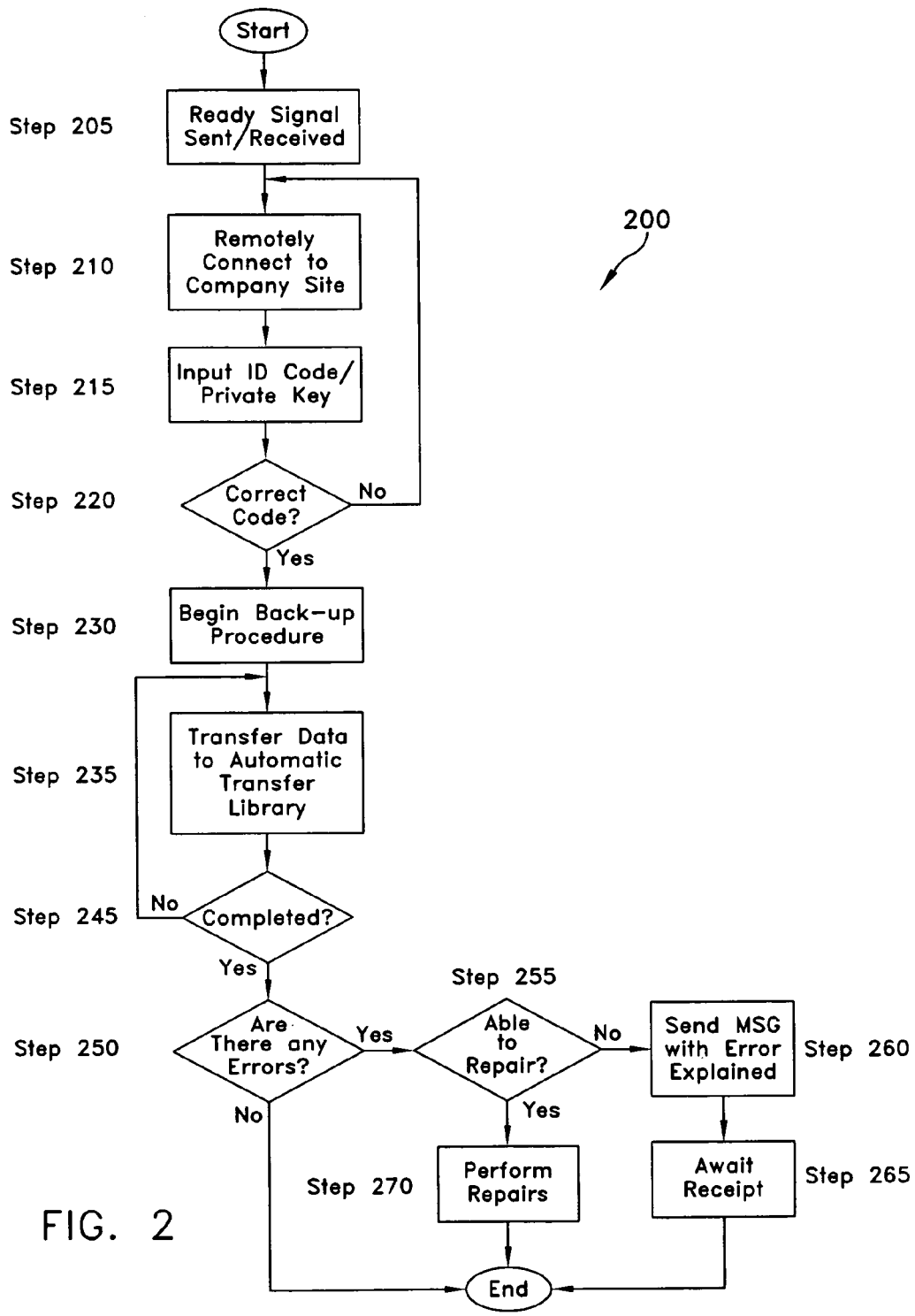
FIG. 2 is a flow chart of a method for implementing an embodiment of the invention.

Referring to FIG. 2, a flow chart 200 shows the steps of a method of the invention. Specifically, the flow chart shows the steps of a method that utilizes a global communications network, such as the INTERNET, for electronically backing up a computer system and for ensuring that the back-up was successfully completed. In one embodiment of the present invention, the first computer 112 receives a ready signal from a customer's computer network. The steps of the method further include electronically connecting to the customer's computer network (Steps 205–220), performing a back-up procedure (Steps 230–245), and sending an appropriate electronic message that repairs are required. In a further embodiment of the invention, a step of the method includes remotely performing required repairs (Steps 250–265).

In one embodiment of the invention, a step of the method includes a central office computer receiving an electronic message from a second computer 162 (Step 205). In one aspect, the second computer 162 belongs to a customer that is a member of an organization that provides a computer memory back-up service. The electronic message behaves like a ready signal that prompts a first computer located in the central office 120 to begin the back-up procedure. The first computer 112 is located in the central office 120 of the organization that provides the computer back-up service. The back-up procedure begins when the first computer 112 remotely connects to a second computer 162 located at the customer's place of business or a computer storage facility (Step 210).

The first computer provides an electronic identification signal to the second computer 162 (Step 215). In one embodiment of the invention, the electronic identification signal includes a cryptographic or encoded message sent by the second computer 162 that is only recognized by the first computer 112. Likewise, the first computer 112 may respond by sending an electronic signal that is only recognized by the second computer 162.

After an electronic connection is obtained, the back-up procedure may begin (step 230). Throughout the back-up procedure the electronic connection is continuously observed. In one embodiment of the present invention a security check is used to validate the private key (Step 220). In that embodiment, if neither the first or second computer recognize the numerical combination, then the electronic connection is closed, the back-up procedure is terminated and a record of an electronic path is recorded by both computers. The electronic path serves as an electronic fingerprint that may be used to identify any attempted breaches in security.

At Steps 235–245, the back-up procedure begins by transferring data from the second computer 162 to an automatic transfer library (ATL). In general, the ATL 170 is a data storage facility that may be located at a site of the customer's choosing. In one embodiment of the invention, the ATL 170 is in electronic communication with the first computer. In one aspect of the invention, the ATL 170 has a dedicated electronic connection to the second computer 162, and the ATL 170 is not directly linked to the global communications network. Data is transferred from the second computer 162 to the ATL 170, and the first computer administers the data transfer. A person of ordinary skill will appreciate that the transfer of data does not occur over open network lines. As a result, an added level of data security is provided to the customer because the possibility of tapping electronic lines to obtain a stream of confidential data is reduced.

In the method of the invention, the first computer administers the data transfer to the ATL 170. The first computer may also check for any errors that may have occurred during the data transfer (Step 250). If an error occurs, then the first computer may provide a remedy to fix a source of the error (Steps 255–270). As a result, the error is automatically corrected, the back-up procedure is not halted unnecessarily, and a human administrator is not required to intervene. However, if the error requires human intervention, an electronic message may be generated that identifies the problem and suggested solution (if any), and sent to a local administrator (Step 260) or to a technician that may be dispatched to the site to perform any necessary repairs. In one embodiment of the invention, the electronic message is in the customer's standard language. In addition, the method of the invention requires an acknowledgment of the electronic message by the local administrator. In this way, the error is corrected and the back-up procedure can be reinitiated at any time.

A method for automatically backing-up a computer system and ensuring that the back-up procedure was successfully completed has been described above. Embodiments of the present invention include a method of remotely backing-up computer systems utilizing a global communications network to ensure that the back-up was successfully completed. The steps of the method include utilizing a first computer to receive a ready signal from a customer's computer network. The steps of the method further include electronically connecting the first computer to the customer's computer network and performing a back-up procedure. The back-up procedure includes transferring data to an automatic transfer library 170 located at a site of the customer's choosing. The steps of the method also include sending an appropriate electronic message that repairs are required, allowing the first computer to remotely perform the required repairs, or notifying a local administrator that human intervention is required.

In another embodiment, a system for automatically backing-up a computer memory and ensuring that the back-up was successfully completed has been described above. The system includes a communications network that implements a method of the invention. The system includes a mechanism that remotely connects to a customer's computer through a global communications network. The system further includes a mechanism that remotely administers a back-up procedure that transfers data to an automatic transfer library. Further, the data transfer does not occur over open network lines. Thus, tapping open network lines during data transfer does not occur. Accordingly, a more secure environment for data storage is provided.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention's limit is defined only in the following claims and the equivalents thereto.

What is claimed is:

1. A method of administering a transfer of electronic data to a data storage device, the method comprising:
   coupling a first computer to a second computer through a network;
   administering the transfer of electronic data to the data storage device;
   transferring an electronic message from the first computer to indicate that the transfer of electronic data is complete;
   transmitting an electronic signal recognizable by the second computer from the first computer to the second computer to operatively couple the first and second computers;
   terminating the transfer of electronic data and decoupling the first and second computers, if the electronic signal is not recognized; and
   recording the termination of the transfer of electronic data and the decoupling of the first and second computers.

2. The method of claim 1, wherein the network includes the Internet.

3. The method of claim 1, wherein the data storage device is an automatic transfer library operatively coupled to the second computer.

4. The method of claim 1, wherein the automatic transfer library is operatively coupled to the first computer.

5. The method of claim 1, further comprising identifying a problem in the transfer of electronic data.

6. The method of claim 5, further comprising remotely repairing the problem.

7. The method of claim 5, further comprising notifying a local administrator to repair the problem.

* * * * *